Oct. 31, 1961   K. W. RODEMICH   3,006,387
BULK STORAGE TURNHEAD
Filed Aug. 29, 1957   5 Sheets-Sheet 1
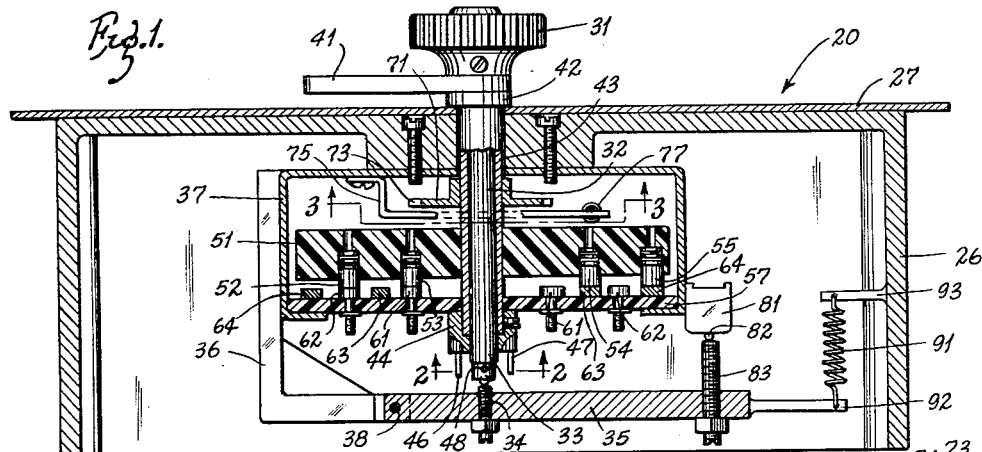
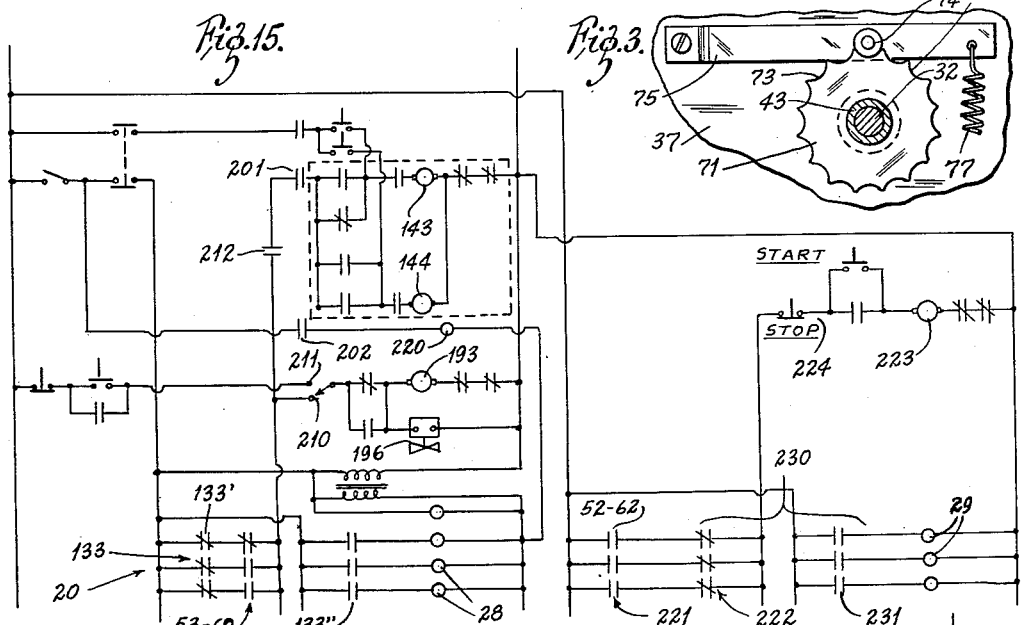
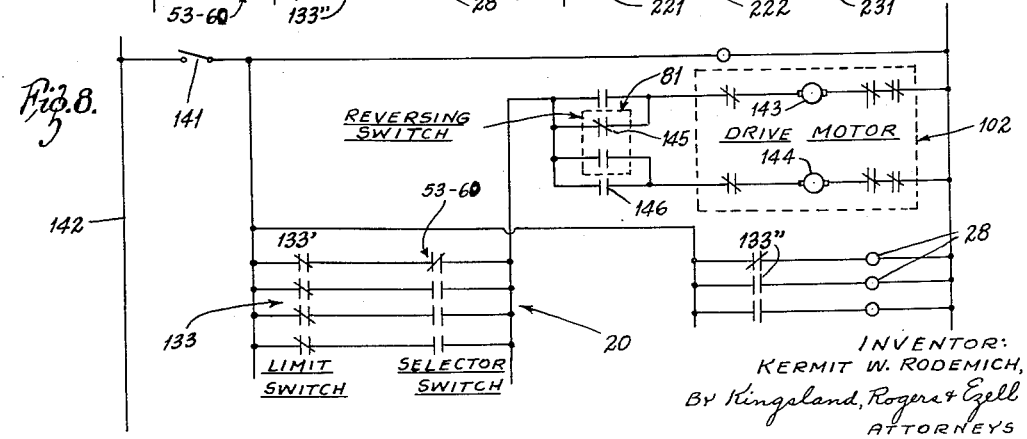
INVENTOR:
KERMIT W. RODEMICH,
By Kingsland, Rogers & Ezell
ATTORNEYS Oct. 31, 1961 K. W. RODEMICH 3,006,387
BULK STORAGE TURNHEAD
Filed Aug. 29, 1957 5 Sheets-Sheet 2
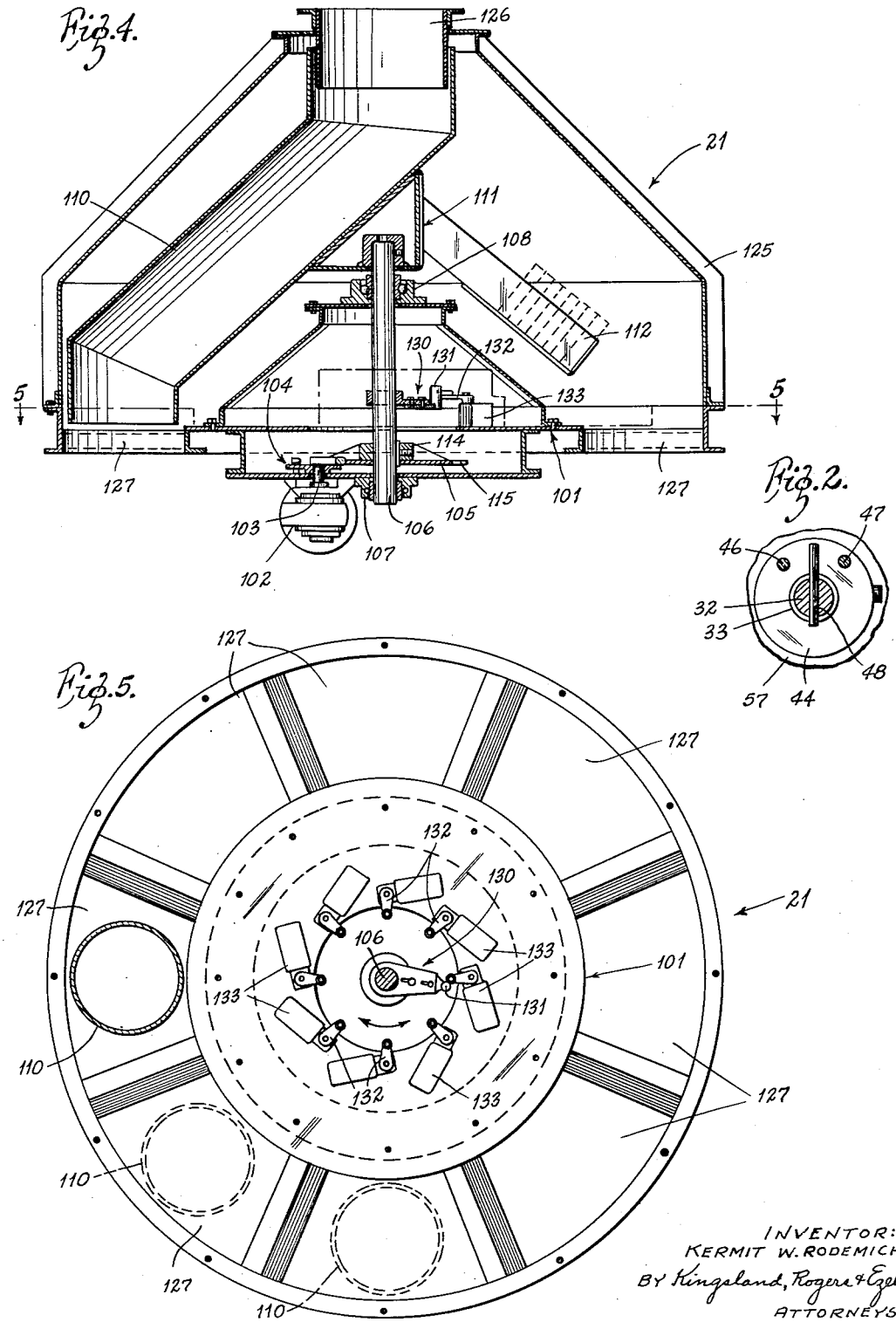
INVENTOR:
KERMIT W. RODEMICH,
BY Kingsland, Rogers & Ezell
ATTORNEYS

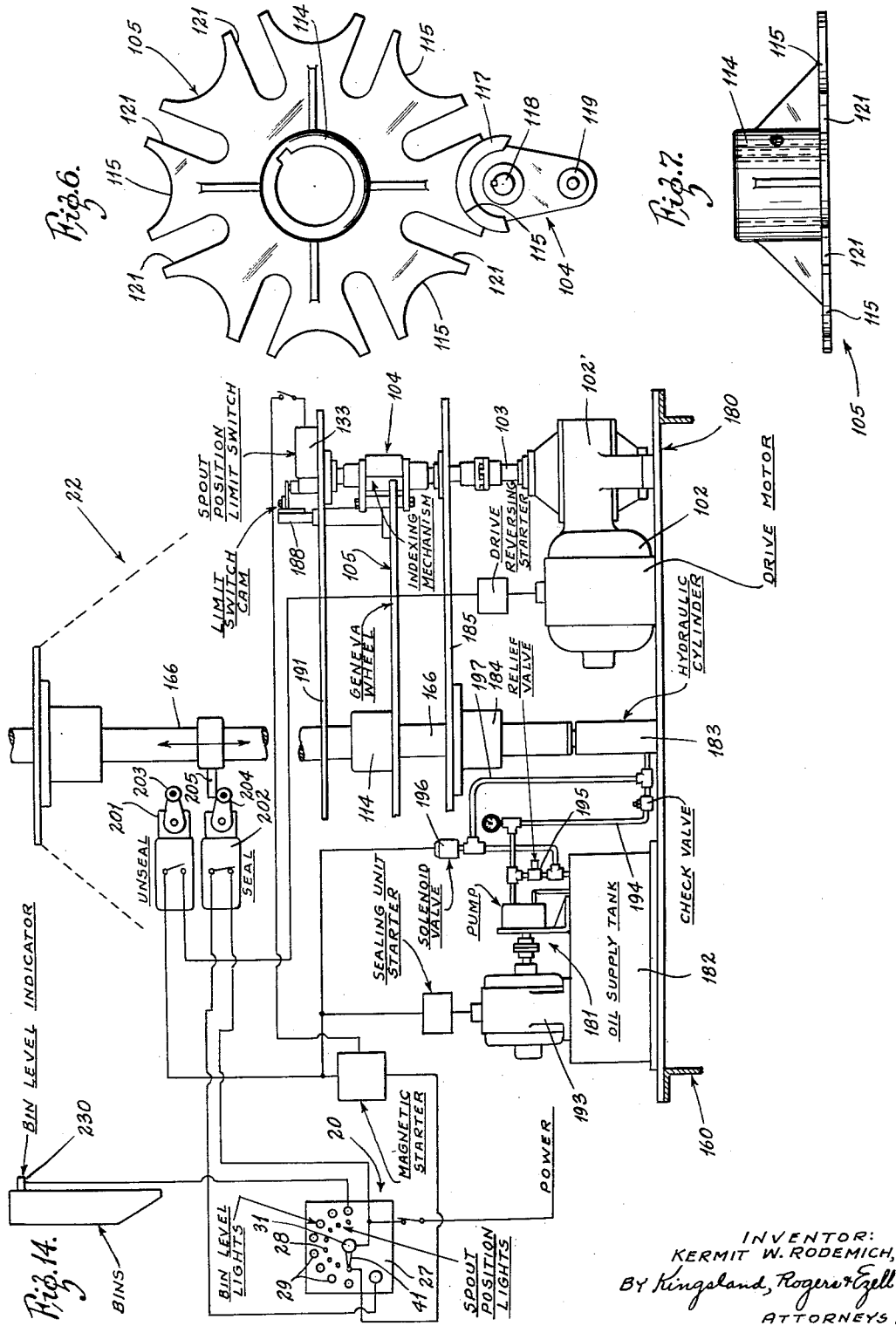

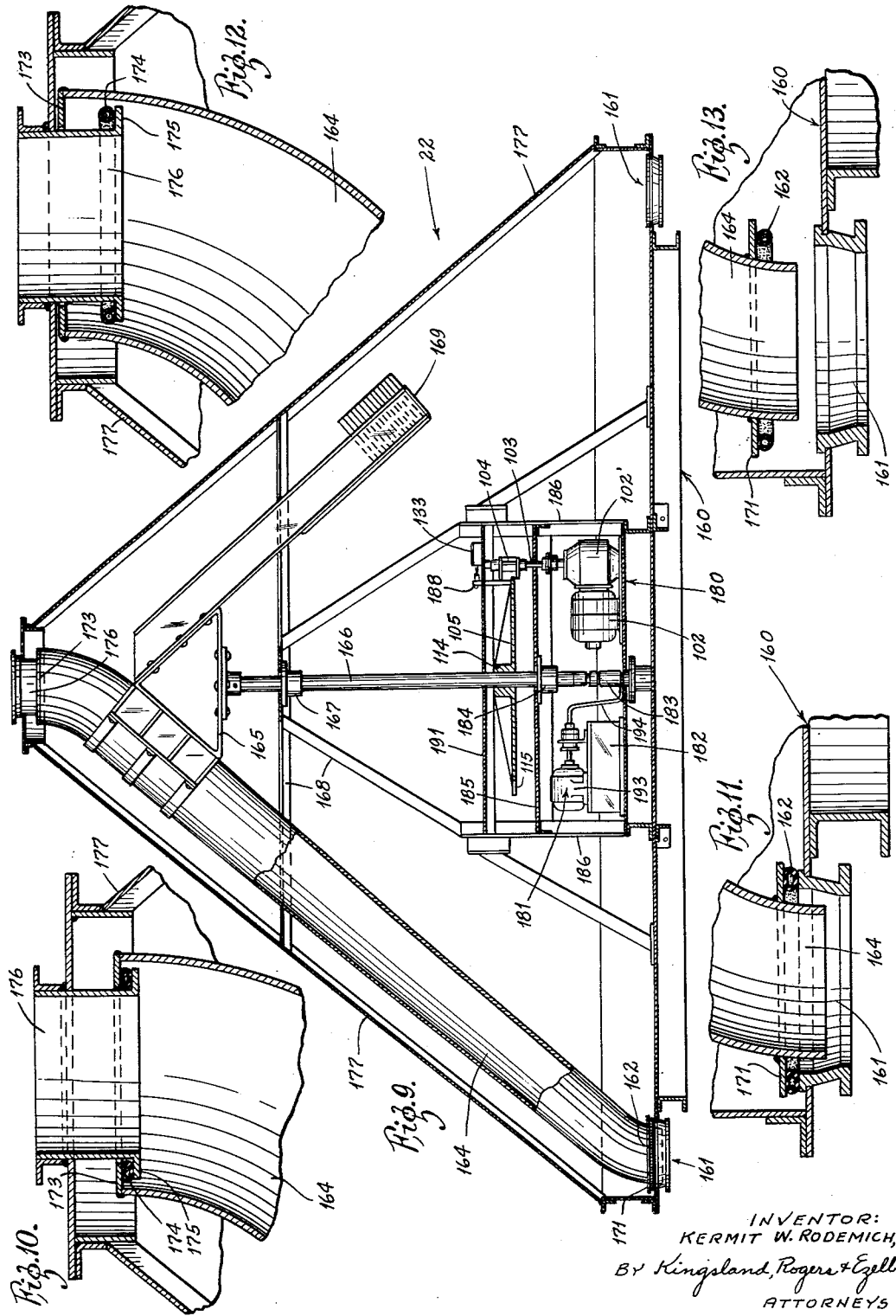

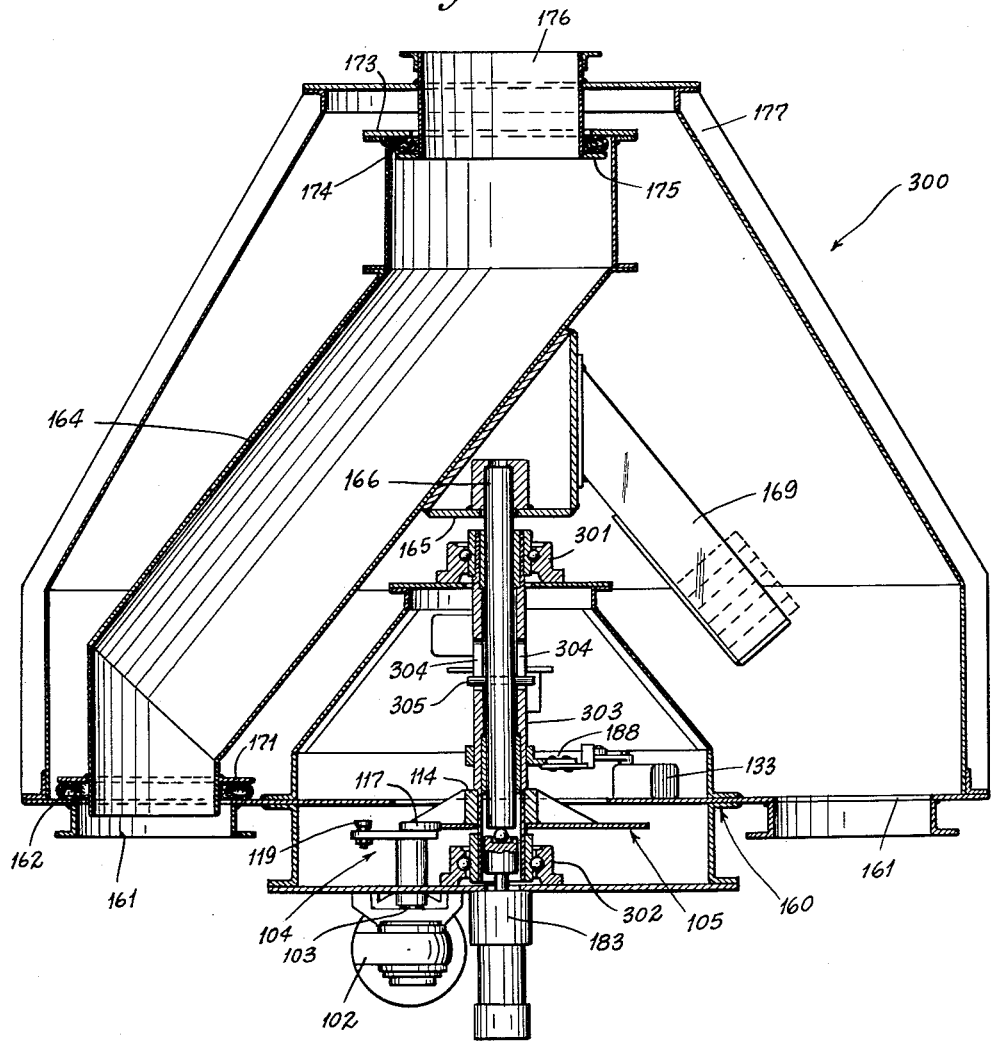

United States Patent Office 3,006,387
Patented Oct. 31, 1961

3,006,387
BULK STORAGE TURNHEAD
Kermit W. Rodemich, 505 S. Polk, Millstadt, Ill.
Filed Aug. 29, 1957, Ser. No. 680,937
10 Claims. (Cl. 141—94)

This invention relates to improvements in bulk storage turnheads and in particular is concerned with indexing apparatus for selectively moving a dispensing spout to desired positions.

There has been provided by means of this invention a bulk storage turnhead which comprises a spout dispensing apparatus which is adapted to receive bulk material from a hopper or the like and to dispense the free flowing bulk material into any one of selected multiple stations. This apparatus finds convenient usage in a number of fields for the distribution of materials and for delivery in a desired and controlled manner into any one of a number of selected receptacles. The application is of very varied scope and can be used in the distribution of fertilizers, feeds, chemicals or any type of desired dispensing operations.

The turnhead apparatus comprises a dispensing spout which can be rotated into desired dispensing position over a number of openings adapted to selectively receive the material from the spout. A selector switch has been provided with a control knob for the control of the movement of the dispensing spout within the turnhead. This selector switch is adapted to be turned to any one of a number of indexing positions, which correspond to the desired station or opening through which the outlet end of the dispensing spout is to be positioned.

There has been further provided by this invention a selector switch which operates in conjunction with a reversing starter whereby the motor is adapted to drive the dispensing spout in the direction of rotation of the control knob employed with the selector switch, which reduces unnecessary travel and represents an economy in operation, expense and time consumption, particularly when a large number of station openings are employed.

There has been further provided in the turnhead apparatus and the selector switch, station indexing means whereby no overlapping movement between stations is possible. This is effected in the selector switch by means of a detent device and in the movement of the dispensing spout by a so-called Geneva wheel indexing mechanism. The operation of the selector switch and the dispensing spout drive mechanism employing the Geneva wheel device is in cooperative relation to effect proper synchronization.

The apparatus of this invention has been further provided with means for sealing the dispensing spout at its end where it receives the material to be dispensed and separate sealing means at the dispensing end, which cooperates with the station opening to which the material is to be dispensed. A hydraulic lift mechanism has been provided to lift the spout from the sealing engagement at its inlet and outlet with respect to the turnhead frame when the dispensing spout is to be rotated to other selected positions. The lifting mechanism is in cooperating relation with the dispensing spout rotating means, whereby the dispensing spout can then be rotated when the spout is elevated. Protective means are provided to prevent rotation of the spout when in the sealed position. The sealing and lifting mechanism provides insurance against the waste of materials in the material discharging operation through the spout and provides for great economy in the operation of the turnhead.

As a consequence of this invention there has been provided a bulk storage turnhead which may be very simply operated from remote control by the operation of a selector switch. Through the operation of the selector switch to a desired station, the dispensing spout of the turnhead may be very simply moved to the corresponding station openings for the dispensing of materials. The apparatus is automatic and may be provided in a further embodiment with means for sealing the spout against its station opening and against the inlet conduit to which it is connected for the prevention of waste of materials. The entire apparatus may be very simply operated by unskilled workmen by the mere movement of the hand knob of the selector switch to any desired station to which delivery is to be made. The simplicity of operation and the ruggedness of construction have provided a turnhead having a rotatable dispensing spout which may be very simply and easily used without fear of breakdown due to operation by unskilled workmen.

Accordingly, it is a primary object of this invention to provide a bulk storage turnhead having a selector mechanism for remote control in which a dispensing spout may be turned to different stations in a reversible operation.

It is a further object of this invention to provide a bulk storage turnhead controlled by a selector switch mechanism in which the direction of rotation of the turnhead is controlled by the direction of rotation of the selector switch.

Still another object of this invention is to provide a selector switch mechanism having a control knob which may be turned with an initial lost motion to determine the direction of rotation of a bulk storage turnhead and in which the movement of a dispensing spout is effected after the direction of the rotation has been set up by the movement of the control knob of the selector switch.

Still another object of this invention is to provide a bulk storage turnhead having a dispensing spout which may be moved to various station openings and in which movement between the stations is effected in sequence with the dispensing spout stopping over each station en route to the selected station to insure against any faulty operation.

Still a further object of this invention is to provide a selector switch mechanism for a bulk storage turnhead which has a control knob movable in selected positions corresponding to station positions for a dispensing spout employed in the turnhead and in which the spout moving mechanism is provided with an indexing mechanism corresponding to the selector switch.

Still another object of this invention is to provide a bulk storage turnhead employing a Geneva wheel drive mechanism in which the dispensing spout employed in the turnhead is moved into position over the corresponding station openings associated with the Geneva wheel indexing means and which correspond to switch positions in a control selector switch adapted for remote control of the apparatus.

Yet a further object of this invention is to provide a bulk storage turnhead which is rotatable to position a dispensing spout into cooperation with selected station openings in which the spout is adapted to be sealed with respect to the dispensing openings.

Still another object of this invention is to provide a turnhead in which a dispensing spout may be rotated into various selected positions for delivery through the spout to station openings in which the spout may be sealed and in which there is elevating mechanism employed to lift the spout away from the sealing position and in which cooperation is provided with a drive mechanism to drive the dispensing spout in the unsealed position.

Still another object of this invention is to provide a bulk storage turnhead apparatus employing a dispensing spout movable to position in sealed relation selected station openings in which there is hydraulic elevating means employed to elevate the dispensing spout and maintain the elevated position while the dispensing spout is rotatably moved to desired selected positions by a remote control selector switch.

Yet another object of this invention is to provide a bulk storage turnhead employing a dispensing spout vertically movable into and out of sealing relation with a base and an indexing apparatus cooperating therewith comprising vertically immovable components connected to a sleeve rotatable with a vertically movable shaft which supports the dispensing spout.

Yet a further object of this invention is to provide a bulk storage turnhead which is rugged in construction and simple in operation and may be operated by relatively unskilled workmen from a remotely controlled selector switch.

Further objects of this invention will appear in the detailed description which follows and will be further apparent to those skilled in the art.

There are shown in the accompanying drawings preferred embodiments of a selector switch mechanism and bulk storage turnhead which may be of a spout nonsealing structure as well as a spout sealing structure. It is to be understood that these drawings are for the purpose of illustration and example only, and that the invention is not limited thereto.

In the drawings:

FIGURE 1 is a view in cross-section through the selector switch of this invention which may be used with the nonsealing type turnhead or the sealing type;

FIGURE 2 is a view in section taken on the line 2—2 of FIGURE 1 showing the selector switch drive collar which is employed to set up the direction of rotation of the drive motor;

FIGURE 3 is a view in section taken on line 3—3 of FIGURE 1 showing the selector switch biasing detent mechanism to insure proper positioning of the selector switch;

FIGURE 4 is a view in vertical section taken through a nonsealing type of turnhead;

FIGURE 5 is a view taken on the line 5—5 of FIGURE 4 showing the station openings of the stationary base associated with the turnhead and the limit switches to effect the proper positioning of the turnhead in association with the selector switch;

FIGURE 6 is a plan view of the Geneva wheel and drive roller commonly employed in the nonsealing and the sealing turnheads;

FIGURE 7 is a view in side elevation of the Geneva wheel of FIGURE 6;

FIGURE 8 is a schematic wiring diagram showing the electrical connections for the selector switch and drive motor for the nonsealing type of turnhead;

FIGURE 9 is a view in vertical section taken through another embodiment of the turnhead which is of a sealing type;

FIGURE 10 is a fragmentary view in enlarged section showing the receiving end of the dispensing spout in sealed relation;

FIGURE 11 is a fragmentary view in enlarged section showing the delivery end of the dispensing spout in sealed relation against one of the station openings;

FIGURE 12 is an enlarged view taken similarly to FIGURE 10, but showing the receiving end of the spout in unsealed position;

FIGURE 13 is a view taken similarly to FIGURE 11 but showing the delivery end of the spout in the unsealed position;

FIGURE 14 is a schematic view of the components of the sealing turnhead and their electrical connections;

FIGURE 15 is a schematic wiring diagram showing the electrical connections for the selector switch, the drive motor and the elevating mechanism for the sealing type of turnhead; and FIGURE 16 is a view in vertical section of a modified form of the sealing type of turnhead.

The remote control selector switch which is used with both the nonsealing and sealing types of turnhead is generally indicated by the reference numeral 20 in FIGURE 1. This selector switch will be first described with respect to a nonsealing turnhead shown in FIGURES 4, 5, 6, 7 and 8 and generally represented by the reference numeral 21. The same selector switch 20 is further adapted to be used with the sealing type of turnhead which is generally indicated by the reference numeral 22 in FIGURES 9 to 15.

The details of construction of the selector switch are best shown in FIGURES 1, 2 and 3, while the general plan view of the switch and panel is shown in general schematic form at the left hand portion of FIGURE 14. The switch is comprised of a housing 26 underneath the panel 27. The panel as shown in FIGURE 14 is provided with a series of spout position lights 28 to indicate the position of the spout as will more fully appear herein below. A series of bin level lights 29 are further provided and are associated with the spout position lights to indicate the level of the bin when it is filled.

A switch control knob 31 is positioned in the center of the switch and is secured to a shaft 32 having a threaded lower end portion 33. The bottom of the shaft is provided with a ball bearing which rests upon an adjustment bolt 34 provided in a reversing switch adjustment plate 35. The adjustment plate 35 in turn is pivotally secured to a bracket 36 through a pin 38. The bracket 36 is secured to a switch casing 37 connected to the underneath side of the housing 26.

The control knob 31 is further provided with a pointer 41 and means for relatively moving the control knob with respect to the pointer to provide a lost motion sequence to set up reversing operation of a drive motor where desired. This operation, as will be more fully set forth below, is effected by the bearing of the bottom portion of the shaft 32 against the adjustment bolt 34. The pointer 41 is secured to a collar 42 which is relatively movable with respect to the shaft 32. The collar 42 is keyed to a sleeve 43 which in turn is keyed to a drive collar 44 having a threaded opening cooperating with the threaded bottom portion 33 of the shaft 32. This assures that, though the shaft 32 is rotatable relative to the collar 42 within the limits explained below, it does not lose contact with that collar because the threads of the shaft and collar are such as to always maintain contact with one another. The drive collar 44 is more fully shown in FIGURE 2 as including two drive pins 46 and 47 which extend from the bottom of the collar and are adapted to be contacted by a shaft pin 48 which passes through the bottom of the shaft. Thus, it will be seen that the shaft is freely movable between the limits where the shaft pin 48 contacts either the drive pin 46 or 47 and that when so contacted the further rotation of the shaft will cause the movement of the sleeve 43 and the pointer 41.

The actual contacting portion of the electrical components of the selector switch includes a plastic switch plate 51 which is secured to the sleeve 43. The plate includes spring biased metal contacts 52 and 53 at the left hand portion as shown in FIGURE 1 and ground or neutral elements 54 and 55 shown at the right hand portion of FIGURE 1. It will be observed that both of the ground elements 54 and 55 are spaced at greater radii from the center of the shaft 32 with respect to the contacts 53 and 52 respectively since these elements are used in a ground circuit and not for balancing the plate. A switch base plate 57 is secured to the bottom portion of the casing 37 and is of a generally circular configuration. The base plate is provided with eight peripherally spaced contact elements 61 which are adapted to be contacted by the single contact 53 on the switch plate, depending upon the position of rotation. These switch contacts 61 correspond in number to the spout positions and may be used to establish a circuit to the drive motor. Similarly an outer row of eight contacts 62 is provided which contacts are adapted to be contacted by the contact 52 of the switch plate.

These contacts may be used with bin level switches which are employed with each one of the bins associated with the station openings. When a bin is filled the associated switch completes a circuit to light up the bin level light to let the operator know that the bin is filled. Simultaneously the switch opens a circuit to auxiliary equipment which may be charging the material to the turnhead to prevent overflow. Also the opening of this switch prevents running of the auxiliary equipment to charge the turnhead should the operator inadvertently select a filled bin. This will be more fully described in connection with FIGURE 15. It will be observed in the drawing in FIGURE 1 that an annular ground and balancing ring 63 is provided upon the base plate. This ring supports the balancing element 54 to make a ground connection and also to prevent teetering of the switch plate. Similarly a ground balancing ring 64 is provided for the support of the ground element 55.

In indexing biasing mechanism is provided for the selector switch and is best shown in FIGURE 3 in addition to the showing in FIGURE 1. This mechanism includes an indexing detent wheel 71 provided with a series of eight detent recesses 73 about tis periphery. The wheel is keyed to the sleeve 43 and is adapted to cooperate with a roller 74 positioned on a supporting bracket 75 connected to the underneath side of the switch casing. The bracket 75 is biased by a biasing spring 77 to urge the roller into one of the detent recesses. By this mechanism the detents are so provided that the number of detents used, eight in number, correspond to the number of switch contacts 61, eight in number, which are positioned upon the base plate and appropriate rotation of the sleeve of the shaft and the pointer 41 properly keys the switch into one of the switch positions through this synchronized arrangement.

The means for providing reversing of the drive motor of the turnhead, which motor and turnhead will be more fully described below, includes a reversing control switch 81, shown secured to the lower right hand side of the switch casing 37 in FIGURE 1. This switch is a micro-switch having a reversible plunger 82 which can be lowered or raised to open or close the switch respectively. As will be more fully described below, the opening or closing of the switch will cause the motor to operate in a reverse direction, depending upon whether the plunger is lowered or raised. The plunger 82 is adapted to be adjusted by a plunger adjustment bolt 83 which is secured to the adjustment plate 35. Thus, when the shaft 32 is caused to be lowered by the clockwise movement of the control knob 31, the adjustment bolt 34 will be urged downwardly to cause the downward movement of the plate 35 about the pivot pin 38. As the plate 35 is lowered the plunger adjustment bolt 83 is likewise lowered to, in turn, cause the lowering of the plunger 82. It will be noted that the adustment plate 35 is biased upwardly by a biasing spring 91. This biasing spring may be connected between an extension 92 of the bracket and a flange 93 connected to the selector switch housing.

The component parts of the nonsealing type of turnhead 21 are best shown in FIGURES 4, 5, 6 and 7, the electrical connections being shown in FIGURE 8. Thus the turnhead 21 is comprised of a stationary flat base 101 upon which a reversible drive motor 102 is mounted. Further as shown in FIGURE 4, the reversing drive motor which may be provided with a conventional gear reducer has its output shaft 103 keyed into a Geneva wheel driving pin or cam generally indicated by the numeral 104. This Geneva wheel driving pin is adapted to cooperate with the Geneva wheel 105 which is keyed to a turnhead drive shaft 106. The drive shaft is mounted in a journal 107 at the bottom portion of the stationary base and is supported at the top of the base by a journal 108.

The turnhead further includes the rotatably movable dispensing spout 110 which is connected to a supporting bracket 111 keyed to the top of the drive shaft. A counterweight 112 extends from the opposite side of the supporting bracket and provides for balancing of the spout 110.

The particular details of construction of the Geneva wheel driving pin 104 and the geneva wheel 105 are best shown in FIGURES 6 and 7. Thus the Geneva wheel is of a conventional structure having a bearing hub 114 keyed to the drive shaft 106 and is provided with a number of arcuate recess sections 115 which correspond in number to the maximum number of station openings desired to be employed. The recess portions 115 correspond with a curved bearing portion 117 formed on the Geneva drive pin 104. The drive pin is pivoted upon the motor drive shaft 103, or a gear reducer, at the pivot point 118. The actual driving element constitutes a drive roller 119 which cooperates with the individual slots 121 positioned about the periphery of the Geneva drive wheel. This is a well known conventional structure in which the operation of the drive pin in conjunction with the Geneva wheel causes the movement of the wheel in spaced sequences with lost motion being provided by the contacting of the bearing portion 117 in the individual recesses 115 about the periphery of the drive wheel.

The turnhead structure 21 further includes a stationary housing 125 which envelopes the spout, counterweight and the driving structure. The housing is provided with a top inlet 126 which is nested in spaced relation within the top opening of the spout 110. A number of station openings 127 are positioned about the periphery of the stationary base 101. By virtue of the cooperative relationship of the Geneva drive wheel and the drive pin, the spout 110 is synchronized by movement into position with individual station openings. During the lost motion sequence, when the bearing portion 117 of the drive pin contacts the recess portions 115 of the drive wheel, the spout remains in position over the particular station opening over which it is passing. This indexing arrangement provides for rapid movement of the spout into position over the station openings and prevents the spout from being incorrectly positioned between any openings where spillage might occur.

The mechanism for correctly stopping the turnhead and the spout 110 in the desired position over a selected station opening is best shown in FIGURE 5. This mechanism includes a limit switch contacting cam generally indicated by the reference numeral 130. The cam, as is also shown in FIGURE 4, is keyed to the drive shaft 106 of the turnhead. It has a contacting portion 131 which is adapted to hit and contact switch arms 132 which are individually associated with a plurality of limit switches 133, positioned in a circle on the stationary base 101. It is to be understood that the same number of limit switches are to be employed as there are contacts in the selector switch 20 and as there are recesses in the Geneva wheel 105. The limit switches 133 contain two separate electrical contacts 133' and 133" which are normally closed and normally open respectively. These contacts 133' and 133" are adapted to be opened and closed, respectively, when the contact switch arm 132 is contacted by the limit switch actuator arm 131. The normally closed contacts 133' are connected into the circuit of the drive motor and are individually associated with the selector switch so that when a particular position is chosen by the control knob, the final opening of the limit switch associated with the desired station opening will open the circuit to the motor and stop it.

The electrical circuit for the electrical components in the selector switch and the drive motor and the limit switches are shown in schematic form in FIGURE 8. In this circuit a main power switch 141 is adapted to control the supply of electricity from the main power line 142. Energization to the drive motor 102 is supplied through the reversing switch 81, the selector switch 20 and the limit switch 133. It will be noted that the drive motor is actually composed of two windings 143 and 144 and that the current is selectively supplied to either one of these windings through the reversing switch 81. The reversing switch has a normally closed contact 145 which supplies current to the drive motor winding 143 when the adjustment plate 35 is lowered by the clockwise rotation of the control knob 31, since the plunger 82 of the reversing switch is biased to a lowered position. When the control knob 31 is rotated to a counterclockwise position, the biasing spring 91 draws the adjustment plate 35 to an upward position about its pivot pin 38 to cause the adjustment bolt 83 to contact the underneath side of the plunger and open the normally closed contact 145 and close the normally open contact 146. This furnishes current to the winding 144 to cause the reverse direction of operation of the motor.

It will be seen that the selector switch 20 in FIGURE 8 has a number of normally open contacts 53–60 which although shown to be only four in number will actually be eight, as this drawing has been broken off for convenience of description. Each one of these switches will correspond to a desired station opening associated with one of the eight contacts 61 upon the base plate of the selector switch. For the purpose of illustration the selector switch will be shown to be positioned in the top selector switch contact in the drawing in FIGURE 8. When the switch is turned to this position from another position, the normally closed limit switches will establish a circuit to the drive motor 102 to cause its movement. When the spout approaches the number one position corresponding to the switch setting for the top switch of selector switch 20, the limit switch cam contacting element 130 will cause the opening of the top normally closed limit contact 133' shown in FIGURE 8. This breaks the circuit to the drive motor and causes it to stop in a desired position over this station opening. When the selector switch is turned to another switch position, such as the number 2 position, which is the next lower switch position in the drawing of FIGURE 8, the circuit will be established through the second limit switch and the second selector switch to the drive motor. This will cause the motor to move to the desired number 2 position. When the number 2 position is reached, the limit switch cam 130 will open the second limit switch and stop the motor.

At the lower right hand portion of the drawing of FIGURE 8, there are seen to be a number of lights arranged in parallel and designated by the numeral 28. These lights are the spout position lights and are each individually associated with a series of normally open contacts 133". These contacts are part of the limit switch 133 and are adapted to be closed by the action of the contacting portion 131 against the arm 132 when the spout passes over a station opening. The closing of the individual switch lights the spout position light associated with it to inform the operator of the position of the spout.

*Sealing type of turnhead*

The sealing type of turnhead 22 is shown in FIGURES 9 through 15. It is used with the same type of selector switch 20 as previously described in connection with the nonsealing type of turnhead. Generally speaking, the turnhead structure is similar for the sealing type of turnhead and the nonsealing type of turnhead with respect to the structure of the Geneva wheel, the driving pin, the drive motor, the limit switches and the structure of the spout. However, there are employed in addition, a sealing structure for the inlet end of the spout and the outlet end of the spout associated with the stationary openings, and hydraulic means for elevating the entire spout structure when it is rotated from one station to another as will be described in detail below.

The turnhead 22 is composed of a stationary base 160 which is provided with eight peripherally spaced station openings 161 in a somewhat similar manner to the nonsealing type of turnhead. However, as appears in FIGURES 11 and 13, a sealing gasket which is made of deformable and sealable material is provided at 162 and is connected to the bottom of the spout. The spout 164 of the turnhead is supported upon a supporting plate 165 attached to the top of a drive shaft 166. The drive shaft is journaled in a journal 167 secured to a support 168 extending upwardly from the base 160. A counterweight 169 extends from the other side of the support plate to balance the spout.

The spout 164 is provided with a sealing plate 171 which further acts as a support for the sealing ring as shown in FIGURES 11 and 13 and the plate is adapted to overlie and press the gasket in sealed relation to the station opening as will further appear. The top inlet end of the spout is provided with an inwardly extending flange 173 which overlies an inlet sealing gasket 174 positioned upon an outwardly extending flange 175 of the inlet 176 to the turnhead. All of the structure is housed within a housing 177 to provide for protection of the components.

The major components of the turnhead elevating mechanism to establish the sealing and nonsealing positions and the turnhead rotating mechanism are shown supported upon a support 180 positioned in the central part of the base 160 in the turnhead. The major components of the turnhead elevating mechanism comprise a hydraulic pump motor 181 resting upon a hydraulic oil tank 182 and positioned to pump oil into a hydraulic cylinder 183. The cylinder is connected to the bottom of the shaft 166 and is adapted to reciprocate it vertically to accomplish the elevation and lowering of the spout 164. The shaft 166 is maintained in position upon the support 180 by a journal 184. The journal 184 is supported by a bracket 185 secured to side plates 186 extending upwardly from the support 180.

The drive mechanism which is adapted to rotate the spout when it is elevated is comprised of a drive motor which is the same as that employed in the nonsealing type of turnhead and similar components in the mechanism will be given identical reference numerals. Thus the drive motor is indicated by the numeral 102 and it is provided with a gear reducer 102' connected to an outlet shaft 103 which is keyed to a Geneva wheel drive pin 104. The Geneva wheel 105 is keyed to the turnhead drive shaft 166 in a similar manner as that described for the turnhead 21 at FIGURE 4. A limit switch contacting cam 188 is employed which is similar to the cam 130 of the turnhead 21 but it will be noted that it is supported from the Geneva wheel rather than from the shaft which is merely a change in structure convenience. The limit switches employed in the turnhead 22 of FIGURE 9 are identified at 133 and are peripherally stationed around the shaft upon a support plate 191 in much the same manner as the positioning of the limit switches in FIGURE 4.

The structure of the hydraulic elevating and turnhead lifting apparatus is more particularly illustrated in the schematic drawing of FIGURE 14. Here it will be seen that the hydraulic pump generally indicated at 181 is driven by a motor 193 and that the pump includes a high-pressure line 194 connected to the bottom of the hydraulic cylinder 183. A relief valve 195 is provided in a pipe connection at one side of the high-pressure line 194 to limit the pressure supplied to the hydraulic cylinder and the other side of the relief valve is connected back into the oil supply tank. A solenoid valve 196 is connected by a conduit 197 to the outlet or low pressure side of the relief valve to discharge into the oil supply tank while the other end of the conduit is connected to the conduit 194 adjacent the hydraulic cylinder. As oil is pumped into the hydraulic cylinder, the shaft 166 is elevated and causes the elevation of the Geneva wheel and the supporting plate 165 upon which the spout and the counterweight are supported.

A control mechanism is associated with the shaft 166 as shown at the top portion of the drawing of FIGURE 14 in order to prevent the operation of the drive motor until the spout is fully elevated. This mechanism includes an unsealed position switch indicated by the numeral 201 and a sealed position switch indicated by the numeral 202. Both of these switches are provided with movable contact elements 203 and 204 respectively, which are adapted to be contacted by a contact arm 205 carried by the shaft 166. As will more fully appear below, the movement of the contact arm 205 against the arm of the unsealed position switch sets up the drive motor circuit for energization so that the spout can rotate when this position is reached. Conversely when the shaft is lowered to the sealed position the movement of the contact arm 205 against the switch element 204 breaks the circuit to the drive motor to prevent its operation.

The arrangement of the electrical components for the sealing type of turnhead shown in FIGURES 9 through 14 is schematically shown in FIGURE 15. In this diagram the arrangement of the selector switch components 20 is shown at the bottom of the diagram at the left hand portion and is identical with that employed in the nonsealing type of turnhead as shown in the electrical circuit of FIGURE 8. Thus initially when the first selector switch at the very top of the row of switches indicated by the numerals 53-60 is closed, a circuit is established through the switch contact 210 to the pump motor 193. It will be observed that there is another contact 211 which is normally open so that the shaft 166 may be raised and lowered when desired by the proper operation of the switch between the contacts 210 and 211. The switch 211 may be manually operated when so desired. When the motor 193 is energized the solenoid valve 196 will also be energized to a closed position. As the pump motor pumps oil through the conduit 194 into the hydraulic cylinder, the turnhead shaft 166 will be elevated. At the start of this operation it will be observed that there is a normally opened switch which is designated 212. This is a switch that is closed by the operation of the sealing unit starter for the sealing motor 193. The closing of the switch 212 partially sets up the drive motor for operation, but it will be observed that the unsealing switch 201 is open and is kept open until the shaft is elevated to the completely raised position where the contact arm 203 causes the closing of the unsealing switch 201. When the switch 201 is closed a circuit is established into the drive motor in the same manner as described in connection with FIGURE 8 such that either the winding 143 or the winding 144 is selectively energized depending upon which direction of rotation the control knob is moved. When the drive motor moves the spout to the selected position the limit switch 133 will be operated and if the number one position is selected the top contact 133' in this row will be opened at the bottom left hand portion of FIGURE 15 which breaks the circuit to the pump motor and to the solenoid. This will cause the opening of the solenoid valve 196 and the drainage of the oil from the hydraulic cylinder back into the oil supply tank 182 through the conduit 197 and the turnhead spout will be lowered into the desired position in sealing relationship with the selected station opening. When the spout is lowered the switch 202 will be closed and will light up a sealed relation indicating light 220 in the selector switch in FIGURE 14. Also the switch 212 will be opened when the pump motor starter drops out and will again prevent the operation of the drive motor as an additional safety precaution.

It will be observed that there is an additional circuit at the right hand portion of FIGURE 15. An additional series of normally opened contacts 221 and bin level indicating lights 29 are provided with selector switch 20 to be used with auxiliary high level bin indicating equipment containing the normally open switch contacts 231 and normally closed switch contacts 222. When these contact pairs designated 230 and containing the contacts 231 and 222 are associated with the selector switch as shown schematically in FIGURE 15, the filling of a bin, of which they are a part, closes normally open contact 231 to light "Bin Full" indicating light 29 and open normally closed contact 222 to open the circuit to charging apparatus motor 223 thus making motor 223 inoperative through that particular circuit with which the full bin is associated. The circuit as shown in FIGURE 15 also provides for an additional manual stop switch 224 so that the motor 223 may always be operated manually.

*The modified sealing type of turnhead*

A modified form of the sealing type of turnhead is shown in FIGURE 16. In this turnhead the dispensing spout is adapted to be elevated vertically in the same manner as the sealing type of turnhead previously disclosed. However, the indexing components including the Geneva wheel and the limit switch mechanism are carried upon a sleeve enclosing the dispensing spout shaft in a lost motion type of connection which reduces the weight of the apparatus to be lifted and further saves wear and tear on the components. The dispensing spout shaft and the sleeve are adapted to be rotated together by means of a pin which connects the two to provide a pin and slot lost motion as will further be described below.

In FIGURE 16 the elements common with the sealing type of turnhead are designated by the same reference numeral. The modified form of this sealing turnhead is generally indicated by the reference numeral 300. The dispensing spout 164 is supported upon a shaft 166 in the same manner as described in connection with the sealing type of turnhead in FIGURES 9 to 15. The shaft 166 is raised or lowered by the hydraulic cylinder 183 to raise the dispensing spout 164 from the sealed relation with its associated openings or upon lowering to effectuate the sealing relationship.

The journals to provide for the support of the shaft include a top journal 301 and a bottom journal 302. It will be particularly noted that a sleeve 303 is positioned between the shaft and the journals. This sleeve is provided with an axially extending slot 304 upon a medial portion of the sleeve. These slots receive a shaft pin 305 which extends through the shaft and may move freely in a vertical direction within the slots when the shaft is raised or lowered. The slot and pin mechanism in the sleeve and shaft provide for lost motion movement when the shaft is moved upwardly or downwardly with respect to the sleeve to raise or lower the sealing spout.

The Geneva wheel 105 in this embodiment is connected directly to the sleeve 303 rather than to the shaft in the modification shown in FIGURE 9. Likewise the limit switch contacting cam 188 is connected directly to the sleeve and will rotate only when the sleeve is rotated. The limit switches 133 are positioned peripherally on the base 160 to be contacted by the cam 188 when it is rotated.

The structure of the hydraulic apparatus and the control mechanisms for the modified type sealing turnhead are identical with those employed in the embodiment in FIGURES 9 through 15. This modified form of turnhead provides a simplified elevating structure in which the weight of the components to be raised and lowered is reduced and in which the relatively moving parts are minimized and maintenance and wear and tear are also minimized due to the lost motion effected between the dispensing spout shaft and the sleeve to which the indexing elements comprising the Geneva wheel and the limit switch mechanisms are connected.

*Operation of the nonsealing type of turnhead*

The operation of the selector switch and the turnhead can best be understood by referring to FIGURES 1, 4 and 5 and the selector panel at the very left hand portion of FIGURE 14. First of all it may be assumed that the control knob is in the position shown in FIGURE 14 and it is desired to change it to the next station which is the second one in the clockwise position.

To effect the clockwise movement of the spout 110 to the next station opening in the clockwise position the control knob 31 is moved in a clockwise direction. There will be a certain amount of lost motion before the pointer 41 starts to move. First of all as the control knob 31 is moved in the clockwise direction it will be caused to be lowered with respect to the pointer 41 due to the threaded engagement with the drive collar 44. As it is lowered, it will in turn cause the downward movement of the adjustment plate 35 through the lowering of the bottom of the shaft 32 against the adjustment bolt 34. As his downward movement proceeds the adjustment bolt 83 is likewise lowered and the reciprocal plunger 82 is permitted to fall which sets up the proper winding in the drive motor 102.

As the control knob 31 is continued to be turned the drive pin 48 will contact the pin 46 and thereby cause the drive collar 44 to rotate with the movement of the control knob. Since the drive collar is connected to the sleeve 43 and the pointer 41 the entire assembly will move as a unit until the control knob 31 is positioned over the next adjacent light, i.e. the second light, in the panel 27 of FIGURE 14. This further movement of the control knob will in turn move the switch plate 51 so that the contact 53 is set up in contact with the next adjacent contact 61 in that row of contacts. As the selector switch is made for this circuit the circuit is completed to the drive motor 102, as appears in FIGURE 8. From an inspection of FIGURE 8 it will be seen that the top selector switch contacts 53–60 will be broken and the switch underneath it will have a made contact which will establish continuity through this circuit and drive the motor through the appropriate winding. In this operation proper indexing is effected through the biasing indexing mechanism of FIGURE 3 where the detents 73 correspond in number to the number of station openings and switch positions.

As the drive motor is started in its operation the Geneva wheel drive pin 104 will be caused to be rotated with an initial lost motion as appears in FIGURE 6 until the actuating roller pin 119 engages the next adjacent slot 121 when the Geneva wheel will be rapidly driven to the next station. When the Geneva wheel is rotated, the shaft 106 of the turnhead to which it is keyed, will be caused to be rotated which moves the spout 110 in the proper direction. As the shaft rotates to the proper position the cam contacting element 130 will contact the movable limit switch arm 132 in the limit switch associated with the second limit switch contact 133′ and cause it to open. This automatically stops the turnhead since the circuit will be broken to the drive motor at the proper position. This completes the movement of the turnhead to the selected position.

The same sequence of steps will be effected where the selector switch is moved in a clockwise position to any one of the further clockwise positions upon the panel. However, there will be no preliminary lost motion since the control knob shaft drive pin 48 is already in bearing engagement with the collar drive pin 46.

Where the selector switch is moved in a counterclockwise position the reverse sequence of steps for the movement of the selector switch components will be effected. Thus there will be a lost motion movement of the control knob shaft drive pin 48 with respect to the drive collar as it is moved from the contacting relation with the pin 46 to the counterclockwise movement drive pin 47. This represents substantially 60 degrees or so of lost motion movement. The reverse movement of the adjustment plate 35 will be effected as the control knob and shaft are raised through the threaded engagement with the drive collar. This causes the upward movement of the plate and the adjustment bolt 83 to raise the reciprocal plunger and reverse the setting of the switches which control the selection of the two drive motor windings.

Finally when the lost motion has been completed the further movement of the control knob 31 in the counterclockwise direction can be effected to move the pointer to the desired station in the counterclockwise movement until its proper setting is obtained, which is automatically effected by the indexing arrangement to prevent any spanning of two station openings.

It will be noted that the switches 133″ complete a circuit to the lights 28 to give the proper information as to the position of the spout at all times. Thus each time the spout is indexed into position with the station opening the corresponding switch in the switch series 133″ will be caused by the action of the limit switch 133 to close and light up the corresponding spout position light 28. This provides full assurance to the operator that the equipment is operating correctly at all times and gives information as to the position of the spout from a remote control position.

*Operation of the sealing type of turnhead*

The operation of the sealing type of turnhead is effected in the same manner as above described. Thus the same type of lost motion movement for the control knob is effected when the spout is to be turned from a reversing position from the last movement. The major change in the operation, and this is not reflected in the operation of the selector switch, is in the automatic operation of the elevating apparatus by the hydraulic pump. This will be described fully below.

For the full description of operation of the sealing type of turnhead reference is made to FIGURES 9 through 15. First of all it will be assumed that the control knob is in the furthermost counterclockwise position on the panel 27 of FIGURE 14. Then it will be assumed as described above in connection with the non-sealing type of turnhead, that the control knob is turned to the next adjacent position in the clockwise direction. At the very start of the operation the spout is in the sealed position as shown in FIGURES 10 and 11 with respect to its associated station opening. This prevents waste or spillage of any material when it is discharged through the spout.

When the control pointer is turned to the next adjacent position in the clockwise direction a circuit is set up in FIGURE 15 through the second limit switch 133′ from the top and the main contact 53–60 of the selector switch 20. However, the reversing drive motor 102 is prevented from operating since the unsealed switch 201 is open. First of all the pump motor 193 will be energized by the passage of current through the selector switch through the main contact switch 210 into the motor. Simultaneously the solenoid valve 196 is energized and is caused to close. The pump starts to operate and hydraulic fluid is pumped through the circuit 194 into the bottom of the hydraulic cylinder, to cause the elevation of the turnhead drive shaft 166. When the spout reaches the top position the "Unsealed" switch arm 203 is contacted by the actuator arm 205 situated upon the turnhead drive shaft and the circuit through switch 201 is closed to provide energization for the selected winding of the drive motor 102.

The drive motor will start its operation and the drive shaft 166 will turn due to the operation of the Geneva wheel drive pin which causes the movement of the Geneva wheel 105. During this operation the spout is maintained in the fully elevated position by the continuance of operation of the pump motor and the bleeding of hydraulic fluid through the relief valve 195 into the oil supply tank 182. As the drive shaft rotates, due to the operation of the Geneva wheel, the spout will be turned into the proper registered position with the next clockwise adjacent station opening.

As the Geneva wheel rotates it will carry with it the limit switch actuating cam 188. When the spout moves into the proper indexed position over the next adjacent station opening the corresponding limit switch 133 will have its contact arm 132 moved by the limit switch actuator 131 to the open position. This will open the second normally open contact 133' and cause the drive motor to stop. Simultaenously as the limit switch contact for the selected spout position opens, the circuit will be broken to the pump motor and to the solenoid. Thus the pump motor will stop and the solenoid will open, which permits the drainage of fluid through the conduit 197 and through the solenoid valve back into the oil supply tank. This takes place slowly as the oil bleeds out so that the spout may be slowly lowered into the proper sealing position with respect to the selected station opening. It will be noted that when the spout drops back to its lowered and sealed position that the lowering of the shaft and the contact arm 205 permits the unsealing switch to open as the contacting engagement with the switch arm 203 is removed. This opens the circuit to the drive motor to prevent any possible operation of the drive motor except when the spout is again in the fully elevated position.

Movement of the turnhead and the spout to various other positions with respect to other station openings is effected in the same manner as described above with respect to the nonsealing type of turnhead. It will be observed throughout this description that the operation of the hydraulic pump and motor and the elevating mechanism for the spout is connected to the drive motor 102 in such a manner as to fully insure that the spout is always elevated before there is any rotation. This prevents operation when the turnhead is in the sealed position which would damage the parts.

The auxiliary circuit at the right hand portion of FIGURE 15 may be used with allied material charging equipment. When the contact pairs designated 230 containing the contacts 231 and 222 are associated with the selector switch as shown schematically in FIGURE 15 the filling of a bin, of which they are a part, closes normally open contact 231 to light "Bin Full" indicating light 29 and open normally closed contact 222 to open the circuit to charging apparatus motor 233 thus making motor 223 inoperative through that particular circuit with which the full bin is associated. The circuit, as shown in FIGURE 15, also provides for an additional manual stop switch 224 so that the motor 223 may always be operated manually.

*Operation of the modified sealing type of turnhead*

The operation of the modified sealing type of turnhead in FIGURE 16 is effected in exactly the same manner as the sealing type of turnhead described by FIGURES 9 to 15 as far as the movement of the selector switch and the operation of the hydraulic apparatus is concerned. However, there is a difference in the mechanical operation of the dispensing spout when it is elevated by the raising or lowering of the shaft 166 due to the lost motion connection between this shaft and the sleeve 303 which supports the Geneva wheel 105 and the limit switch contacting cam 188.

Thus when the operation of the turnhead is started, the dispensing spout will be moved upwardly by the raising of the shaft 166 due to the operation of the hydraulic system. This raising is effected without raising the sleeve 303 since the pin 305 can move freely within the slots 303 and 304. As soon as the dispensing spout has been fully elevated, the closing of the appropriate safety switches will cause the operation of the drive motor which rotates the Geneva wheel 105. The rotation of the Geneva wheel will cause the rotation of the sleeve 303 and the rotation of the dispensing spout shaft 166 due to the positioning of the pin 305 in the slots 304. Accordingly the sleeve and the shaft will move as a unit when the drive motor causes the rotation of the Geneva wheel. The contacting cam 188 will then rotate and operate in the same manner as described for the embodiment of FIGURES 9 to 15.

By this modification a simplified structure has been provided in which the weight of the components to be elevated is reduced with consequent and attendant savings in the power load. Further the relatively moving parts have been reduced and wear and tear upon the apparatus is minimized.

Various canges and modifications may be made in the apparatus of this invention. For example the dispensing spout may be adapted to move in a linear direction rather than rotatably and when speaking of "turnhead" throughout this description and in the accompanying claims it is to be understood that this term includes linear as well as rotatable movement of the spout. Linear movement can easily be effected by a rack and pinion gear movement or by other conventional means as will be well recognized by those working in this art. Such changes and modifications as are obvious to those skilled in the art are to be included within the teaching of this invention as defined by the claims appended hereto.

What is claimed is:

1. A rotatable turnhead having a delivery spout movable into position with selected station openings provided in a turnhead base, said turnhead having control means consisting of a rotatable control knob and switch cooperating with a drive motor to move the turnhead spout in indexed relation to said selected station openings and said control means being provided with motor reversing switch means operable in response to the direction of rotation of said control knob before the turnhead is rotated, said control means further including a control pointer movable to various selected station indicating points corresponding to different station openings and having a lost motion means connecting it to said control knob, said control pointer being rigidly secured to a selector switch having separate switch circuits which are adapted to close a circuit to said motor when said control pointer is moved to a selected station indicating point, said lost motion means being neutralized when the control knob is turned in the same direction as the last direction in which it was turned.

2. A rotatable turnhead having a delivery spout supported by said turnhead and rotatable therewith into position with selected station openings provided in a turnhead base, said turnhead having control means consisting of a rotatable control knob and switch cooperating with a drive motor to move the turnhead spout in indexed relation to said selected station openings and said control means being provided with motor reversing switch means operable in response to the direction of rotation of said control knob before the turnhead is rotated, said control means further including a control pointer movable to various selected station indicating points corresponding to different station openings and having a lost motion means connecting it to said control knob, said control pointer being rigidly secured to a selector switch having separate switch circuits individually including a normally open switch contact when the control pointer is turned to a selected station indicating point, and a normally closed limit switch which is opened when the spout is rotated to the selected station opening.

3. A rotatable turnhead having a delivery spout supported by said turnhead and rotatable therewith into position with selected station openings provided in a turnhead base, said turnhead having control means consisting of a rotatable control knob and switch cooperating with a drive motor to move the turnhead spout in indexed relation to said selected station openings, and means for maintaining the control knob and turnhead in properly indexed relation comprising separate indexing elements cooperating with the control knob and the drive motor, one of said elements comprising a Geneva wheel connected to the turnhead and a Geneva drive pin driven by an output shaft of said drive motor, said Geneva wheel having rest positions synchronized with the turnhead to position the spout over the station openings, and said control means being provided with motor reversing switch means operable in response to the direction of rotation of said control knob before the turnhead is rotated, said control means further including a control pointer movable to various selected station indicating points corresponding to different station openings and having a lost motion means connecting it to said control knob, said control pointer being rigidly secured to a selector switch having separate switch circuits individually including a normally open switch contact when the control pointer is turned to a selected station indicating point, and a normally closed limit switch which is opened when the spout is rotated to the selected station opening.

4. A rotatable turnhead having a delivery spout supported by scaid turnhead and rotatable therewith into position with selected station openings provided in a turnhead base, said turnhead having control means consisting of a rotatable control knob and switch cooperating with a drive motor to move the turnhead spout in indexed relation to said selected station openings and means for maintaining the control knob and turnhead in properly indexed relation comprising separate indexing elements cooperating with the control knob and the drive motor, one of said elements comprising a Geneva wheel rotatably engaged by a control in contact with a rotatable operating shaft connected to said turnhead and a Geneva drive pin driven by an output shaft of said drive motor, said Geneva wheel having rest positions synchronized with the turnhead to position the spout over the station openings, said control means further including a selector switch means comprising separate switch circuits including a normally open switch contact which is closed when a control pointer is turned to a selected station opening and a normally closed limit switch which is opened when the spout is rotated to the selected station opening, said limit switch for each switch circuit being located about the periphery of said operating shaft upon a stationary base and being adapted to be opened by a cam rotatable with said shaft.

5. A turnhead having a delivery spout movable into sealed position with selected station openings provided in a turnhead base, and control means consisting of a control knob and switch cooperating with a means for elevating the spout and turnhead to an unsealed position and a turnhead drive means to move the turnhead and spout in elevated position in indexed relation to said selected station openings, said spout and turnhead elevating means comprising hydraulic pump means connected to an operating shaft supporting the turnhead, said hydraulic pump means being adapted to elevate and lower said shaft and turnhead in response to the operation of the control means, said control means having a switch means for operating the hydraulic pump means to elevate the turnhead and spout to unsealed position and sequentially operate the turnhead drive means while operating the hydraulic pump means to maintain the turnhead and spout in unsealed elevated position during movement between station openings, said switch means being adapted to be opened at the completion of movement of the turnhead and spout to the selected station opening to stop the hydraulic pump means and lower the turnhead and spout into sealed position with the selected station opening.

6. A turnhead having a delivery spout movable into sealed position with selected station openings provided in a turnhead base, and control means consisting of a control knob and switch cooperating with a means for elevating the spout and turnhead to an unsealed position and a turnhead drive means to move the turnhead and spout in elevated position in indexed relation to said selected station openings, said spout and turnhead elevating means comprising hydraulic pump means connected to an operating shaft supporting the turnhead, said hydraulic pump means being adapted to elevate and lower said shaft and turnhead in response to the operation of the control means, and means for maintaining the control knob and turnhead in properly indexed relation comprising separate indexing elements cooperating with the control knob and the drive motor, one of said elements comprising a Geneva wheel connected to the turnhead and elevatable with it and a Geneva drive pin mounted upon a stationary support and driven by an output shaft of said drive motor, said Geneva wheel having rest positions synchronized with the turnhead to position the spout over the station openings, said control means having a switch means for operating the hydraulic pump means to elevate the turnhead and spout to unsealed position and sequentially operate the turnhead drive means while operating the hydraulic pump means to maintain the turnhead and spout in unsealed elevated position during movement between station openings, said switch means being adapted to be opened at the completion of movement of the turnhead and spout to the selected station opening to stop the hydraulic pump means and lower the turnhead and spout into sealed position with the selected station opening.

7. A rotatable turnhead having a delivery spout supported by said turnhead and rotatable therewith into sealed position with selected station openings provided in a turnhead base, and control means consisting of a control knob and switch cooperating with a means for elevating the spout and turnhead to an unsealed position and a turnhead drive means to move the turnhead and spout in elevated position in indexed relation to said selected station openings and said control means being provided with motor reversing switch means operable in response to the direction of rotation of said control knob before the turnhead is rotated, said control means further including a control pointer movable to various selected station indicating points corresponding to different station openings and having a lost motion means connecting it to said control knob, said control pointer being rigidly secured to a selector switch having separate switch circuits which are adapted to close a circuit to said motor when said control pointer is moved to a selected station indicating point.

8. A turnhead having a dispensing spout vertically movable with a shaft to and from a sealed position with selected station openings in a turnhead base, turnhead drive means for moving the dispensing spout in an elevated unsealed position in indexed relation to said selected station openings, said drive means including a rotatably powered member cooperating with said shaft through a lost motion means whereby said shaft may move vertically with respect to said rotatably powered member.

9. A turnhead having a dispensing spout vertically movable with a shaft to and from a sealed position with selected station opening in a turnhead base, turnhead drive means for moving the dispensing spout in an elevated unsealed position in indexed relation to said selected station openings, said drive means including a rotatably powered sleeve member slidably receiving said shaft, and lost motion means connecting said shaft and sleeve member providing for independent vertical movement of the shaft axially with respect to the sleeve and for rotation of said shaft when the sleeve member is rotatably powered, said lost motion means comprising an abutment upon said shaft extending through an axially extending slot in the wall of said sleeve.

10. A turnhead having a delivery spout movable into position with selected station openings provided in a turnhead base, receptacles associated with said openings to receive material charged through the delivery spout, said turnhead having control means consisting of a control member and switch cooperating with a drive motor to move the turnhead spout in indexed relation to said selected station openings, said control means further including a selector switch means comprising separate switch circuits including a normally open switch contact which is closed when the control member is operated for a selected station opening and normally closed limit switch which is opened when the spout is moved to the selected station opening and a switching circuit controlled by the receptacles receiving material through said openings for controlling equipment charging material to the turnhead, said circuit including a switch adapted to be opened by the filling of an associated receptacle to interrupt the circuit controlling the operation of said charging equipment and stop the flow of material, said switching circuit further including a second normally open switch which is closed when the control member is operated for a selected station opening to complete the circuit to the charging equipment until the associated receptacle is filled.

References Cited in the file of this patent

UNITED STATES PATENTS

| | | |
|---|---|---|
| 2,243,840 | Delivuk | June 3, 1941 |
| 2,389,268 | McKinnis | Nov. 20, 1945 |
| 2,592,157 | Kendall | Apr. 8, 1952 |
| 2,640,976 | Prohaska | June 2, 1953 |
| 2,756,859 | Steffen et al. | July 31, 1956 |
| 2,848,019 | Corbin et al. | Aug. 19, 1958 |

FOREIGN PATENTS

| | | |
|---|---|---|
| 803,166 | Germany | Mar. 1, 1951 |